United States Patent [19]

Buote

[11] Patent Number: 4,727,494

[45] Date of Patent: Feb. 23, 1988

[54] COMPUTERIZED ROBOT CONTROL SYSTEM WITH SCHEDULING FEATURE

[75] Inventor: William J. Buote, Natick, Mass.

[73] Assignee: Zymark Corporation, Hopkinton, Mass.

[21] Appl. No.: 836,841

[22] Filed: Mar. 6, 1986

Related U.S. Application Data

[63] Continuation-in-part of Ser. No. 689,143, Jan. 1, 1985, Pat. No. 4,689,755, which is a continuation-in-part of Ser. No. 528,934, Sep. 2, 1983, Pat. No. 4,586,151.

[51] Int. Cl.$^4$ .................... G06F 15/46; G05B 19/42
[52] U.S. Cl. ................................ 364/513; 364/191; 901/6
[58] Field of Search ............ 364/513, 478, 468, 148, 364/401, 402, 474, 475, 191–193; 901/6, 7, 8, 30, 31, 50; 318/568; 414/730

[56] References Cited

U.S. PATENT DOCUMENTS

| | | | |
|---|---|---|---|
| 4,503,507 | 3/1985 | Takeda et al. | 364/513 |
| 4,577,284 | 3/1986 | Christy et al. | 364/513 X |
| 4,580,207 | 4/1986 | Arai et al. | 364/468 X |
| 4,608,525 | 8/1986 | Mori et al. | 901/6 X |

OTHER PUBLICATIONS

Bedini et al—"Optimal Programming of Working Cycles for Industrial Robots"—Transactions of the ASME Journal of Mechanical Design, vol. 101, Apr. 1979—pp. 250–257.

Medeiros et al—"Simulation of Robotic Manufacturing Cells"—Simulation, Jan. 1983, pp. 3–12.

Primary Examiner—Joseph F. Ruggiero
Attorney, Agent, or Firm—Andrew F. Kehoe

[57] ABSTRACT

In a robotic system for efficient serialization of processing a number of samples by a robotic manipulator through an identical sequence of processing steps with a plurality of the samples being processed through the sequence at a given time, such that they must share the services of the manipulator, the improvement wherein a computer control means 92 operates a schedule-control feature which forms means both (a) to relate (1) the time within said sequence required to carry out all said steps which do not require the robotic manipulator (22) to (2) the time within said sequence which does require the robotic manipulator and the minimum number of processing spaces (305) for samples in non-robotic-manipulated time steps; and (b) to provide a priority of action for manipulator such that the sample which is both ready for further processing and most advanced in the sequence is given priority for further completion when said manipulator (22) is available for said further processing.

5 Claims, 12 Drawing Figures

```
                        SAMPLE NUMBER
TIME    1    2    3    4    5    6    7    8
 0.0    A
 2.0    B
 7.5         A
 9.5         B
15.0              A
17.0              B
22.5                   A
24.5                   B
30.0                        A
32.0    C                   B
37.0    X
37.5                                  A
39.5         C                        B
44.5         X
45.0                                       A
47.0              C                        B
52.0              X
52.5                                            A
54.5                   C                        B
59.5                   X
60.0
62.0                        C
67.0                        X
``` etc.

COMPUTERIZED ROBOT CONTROL SYSTEM WITH SCHEDULING FEATURE

This application is a continuation-in-part of commonly-owned and co-pending U.S. patent application Ser. No. 689,143 filed by William J. Buote on Jan. 1, 1985 U.S. Pat. No. 4,689,755 under the title "Self-Configuring Computerized Robot Control System with Call-Back Feature". That application is, in turn, a continuation-in-part of U.S. patent application Ser. No. 528,934 filed Sept. 2, 1983 U.S. Pat. No. 4,586,151 and entitled "Improved, Self-Configuring, Robot Control System".

BACKGROUND OF THE INVENTION

This invention relates to a system for controlling the performance of a robot when the robot is engaged in carrying out serialized procedures on a number of samples, e.g., on samples being prepared in a chemical laboratory.

Serialized procedures are desirable because they tend to allow optimum use of processing equipment and tend to minimize some of the inherent problems with batch processing. For example, in a well-executed serialized procedure each sample should receive identical processing, thereby eliminating variation assignable to such common variables as different inter-step waiting times or, worse, variation in substantive steps (e.g., heating, centrifugation) while the operator attends to a different batch.

Laboratory robotics seemed to provide an excellent way to automate serialization because of its ability to combine programmed computer control with a number of sequential operations of a given procedure. The use of many laboratory robotic procedures is described in "Advances in Laboratory Automation Robotics 1984" by Gerald L. Hawk and Janet R. Strimatis (1984, Zymark Corporation, Inc., Hopkinton, Mass). Some specific advantages of serialized procedures are disclosed in an article by Zenie in "Trends in Laboratory Automation" American Laboratory, pages 51–57, February 1985.

Nevertheless, many rather simple serialized procedures, when applied to a number of samples, can make very substantial demands on the computer control means of a robotic system taxing the ability of the system to meet the potential for serialization without putting excessive programming demands on the operator or, worse, leaving the operator without practical means to obtain the potential advantages one might otherwise obtain by serializing a given procedure.

In an automated system which includes one or more mechanisms which are to be controlled by a computer, and one or more objects upon which work or tasks are to be performed, there are various objectives to which a computer-directed scheduling of the mechanisms can be directed. These objectives could be, for example, to maximize the utilization of the machinery; to maximize the throughput of objects being processed; to minimize the time for a given object to be processed; to respond to an unscheduled request (an interrupt) in a short time period; etc. Many system schedulers have been developed in the past, most with objectives to maximize machine utilization and minimize response time to interrupts. The objects being processed, be they cans of tuna on a processing line, or people sitting at computer terminals, or people waiting for an elevator in a large building, will receive service when the scheduler dictates.

In the purely data systems environment, the machine i.e., the computer, is almost completely interruptible. The computer can save its "current" state at an interruption in all but the most critical moments of performing most tasks, and proceed on to some totally unrelated task, returning to the saved "current state" and the original task some time later and continuing the task from exactly where it left off. Interrupts are not honored during critical moments, causing a delay in servicing of the interrupting request. These delays become very short in highly computerized functions such as information retrieval.

However, when the computer must interact to accommodate operation of physical machinery, the interrupts are a much greater problem. In the typical robotic environment, manipulator interrupts are usually quite difficult to deal with and are generally excluded from the design of fixed automation equipment.

In sample processing wherein there are relatively long periods during which materials are being processed by a robotic manipulator, interrupts are either not possible or not desirable. This has presented problems to those wishing to schedule sequences of operations on individual samples (materials or objects) which are extremely repeatable from sample to sample to achieve a uniform sample of history, while also making the number of samples processed per unit time as high as possible without interfering with uniform sample history.

It is the problem of providing improved scheduling of computerized machine operations to which the inventor has directed his efforts.

RELATED APPLICATIONS

A promising self-configuring robotic control system is disclosed in a U.S. patent application Ser. No. 472,642 filed on Mar. 7, 1983 by Hutchins, Buote and Finn. This patent will issue as U.S. Pat. No. 4,578,764 on Mar. 25, 1986. That application relates to a robot-control means which does include the ability to incorporate a number of independent tools or operating systems including operating systems not defined before implementation of the robot control means by the purchaser thereof. The invention disclosed herein may be viewed, in part, as an improvement in the process of operating a self-configuring robotic system of the type earlier disclosed in Ser. No. 472,642.

A Laboratory Robot System Disclosed in Related Applications

Although the processing scheme of the invention newly described may be utilized with any number of robotic systems, it is believed to be best utilized with the existing ZYMATE automatic laboratory processing system available from ZYMARK Corporation of Hopkinton, Mass. For that reason, the following disclosure and drawings associated therewith is included to show the mode of operation of such a system as has been described in the aforesaid related applications: That system is described in FIGS. 1 through 10 of the present application as follows:

Turning now to FIGS. 1 and 3, there is shown in block diagram form a robotic system and indicated generally by the reference numeral 10. This system is a self-configuring robotic system of a type with which the present invention is advantageously utilized. The robotic system 10 utilizes a conventional computer 12 having an operating system containing at least nucleus, a sequence reprogrammer and task support services. Computer bus 14 includes at least data, address and read/write lines 16 that are electrically connected through physically separable connections 18 to a module indicated generally by the reference numeral 20.

The structure of module 20 will be discussed below in connection with FIG. 2. For now, it is sufficient to note that module 20 is electrically connected to a robot 22. The term "robot", as used herein, means: "A reprogrammable, multifunction manipulator designed to move material, parts, tools, or specialized devices through variable programmed motions for the performance of a variety of tasks." This is the definition for the term "robot" that has been adopted by The Robotics Institute of America.

As shown in FIG. 1, the robotic system of the present inventions includes at least one other module ($M^2$) that is electrically connected to a utilization means 24. The utilization means 24 can comprise either another robot 22 or a means for performing a defined task. Expansion of the robotic system is provided for through the use of additional utilization means and associated modules, e.g., module ($M^n$).

The detailed structure of module 20 is illustrated in the block diagram of FIG. 2. Each module contains all of the device intelligence 26 for its associated device 28. Intelligence is transmitted and received via electrical conduits 34. Device 28 generically represents the previously mentioned robot 22 and utilization means 24. The module 20 also contains a control block 30 having a control block flag and a starting offset for computer 12 and an appropriate input/output interface 32 between the computer 12 and the device 28. If desired, the module 20 can also include device memory 36 represented by the dashed lines in FIG. 2.

The device intelligence 26 contained within module 20 can be stored in a variety of conventional forms. For example, the device intelligence can be stored in read-only memories (ROM'S).

It will be appreciated from the preceding description of the hardware structure of the robotic system that each device 28, whether it be a robot 22 or a utilization means 24, has an associated module 20 that contains all of the intelligence for the particular device. The associated module also provides a control block flag and starting offset for the computer and an appropriate I/O interface between the computer and device 28. The control block flag is read by the computer 12 which determines the presence of a robot 22 and associated module 20. The computer 12 then executes the initialization program found at the starting offset which configures the system. The particular I/O mechanism used between the computer 17 and the robot 12 is the last piece of information found in the control block. Each module is electrically connected to the common computer bus 14 through a plurality of the separable electrical connections 18. It should be noted that all of the device intelligence is on the device side of the physical interface formed by the separable electrical connections 18.

Thus, in configuring or reconfiguring a system, it is possible to simply plug the appropriate device module 20 into the computer bus 14 because the module contains all of the corresponding device intelligence, the appropriate control block information for computer 12 and the input/output interface between the device and the computer. This particular system architecture greatly simplifies the implementation and configuration of a specific robotic system to accomodate the needs of an end user. Since the device and its associated module constitute a separable unit, various task-performing devices can be attached to or removed from the robotic system 10 simply by plugging in or removing the appropriate module 20.

Turning now to FIG. 3, there is shown a data flow diagram for the robotic system of the present invention. Referring to the upper righthand corner of FIG. 3, device 28 is initially programmed using the device intelligence to porduce a data block containing a device identifying prefix, data block name selected by the "End User" and device parameters for the specific device. The data block is saved in a dictionary that contains a plurality of data blocks each with prefix and name and associated device parameters. The sequence intelligence for controlling the sequential operation of the devices is contained in a program for computer 12. The program, which has the dictionary names, defines the sequence in which the data blocks are obtained from the dictionary and executed. The sequence intelligence and the dictionary need not be able to decode the device parameters, as indicated by the shaded sections of the data blocks under sequence intelligence and dictionary in FIG. 3. By way of illustration, FIG. 3 depicts the data flow for execution of Name 3 from the dictionary. A command is issued to the device intelligence to pass the "Name 3" device parameters to the prefix identified device 28 causing operation of the device in accordance with the stored device parameters.

Also in FIG. 3, block 29 is a call back function. In this preferred embodiment, device 28, with its intelligence can activate this function. At some later time, device 28 will be activated again even though there is no named control system program entry. Here the call back is a time out where device 28 will be re-activated after a given time interval has elapsed. So device 28 can re-activate itself, even in the middle of another named function. This allows greatly increased control system programming efficiency and simplicity. FIG. 10 shows the activization of the call back function by the device itself. It should be noted that the execution of a name function in the control system program will terminate any earlier call back function which might be activated.

Referring to FIG. 4, it is seen that the control process of the invention, comprehensively viewed, includes a step wherein the module intelligence is taught by an operator, through the system controls, a particular operation, for example to go to a certain place and retrieve a test-tube from a rack and then to bring the test tube to another process station A. The module's memory can receive this teaching, but is is the intelligence carried by the module that will subsequently decide how the instruction will be carried out. Thus a robot told to go to a certain place may itself decide how it gets there by knowing where it is when the instruction is given, what obstacles are in its path, whether another earlier operation on which the test tube moving is dependent has been carried out, etc.

FIGS. 5 through 8 relate to the control system as it is implemented by program code.

As seen in FIG. 5, during the teaching step the command-specific parameters for the task or "device action" are stored in a temporary dictionary entry area. The area can be in the module itself or the main system. It is often convenient to have a memory section in the main CPU which is "owned by" a specific module instead of in the module itself. The task parameters are to be one component of a Dictionary entry which defines the task, the module which is to use its intelligence in interpreting the task, and the name with which the operator chooses to tag the task parameters. This storage is shown in FIG. 6.

FIG. 6 also illustrates that when the temporary dictionary entry is complete, the entire entry can be transferred from its temporary buffer memory section to a more permanent System Dictionary.

FIG. 7 illustrates to the fact that, in programming an entire sequence of module operations for the same or different modules, one will assemble a series of command entries, i.e. action names. However, it is to be noted that these command entries taken together form a very simple, operator-selected, program language that is at once highly effective and versatile.

In a typical situation, the name of the action will be one having a highly specific meaning for the operation. For example, it may be "Tube-to-A". Once the storage in the System dictionary is complete, the mere call for using of the action name will cause the "Tube-to-A" action to be intelligently controlled by the code of intelligence-bearing module.

As shown in FIG. 8, the process will function, when a specific command name is given, by selecting that name in the dictionary, selecting with it the identify of the module owning the entry and selecting also the task-defining parameters stored as part of the dictionary entry. The module then performs whatever action has been defined for it, but does so using its own logic and intelligence. Thus if instructed to go to a certain point in space, it will, typically, choose a path that makes the best sense, i.e. the one that is shorter.

In the description of the system, it will be noted that the command-specific parameters are stored in temporary buffer memory before being committed to the dictionary. This serves an important advantage in the process described herein, because it avoids having to commit extraneous information to the permanent memory. Thus, in a simple example, when a robot position to be named "A" is established, one can put "A" in the permanent memory and the move through a series of intermediate positions to position to be named B. The intermediate position will not be placed in the memory when B is "named" for the permanent dictionary by being placed in permanent memory.

However, it should be understood that a sequence dictionary entries can also be given a single dictionary name if desired using the system of the invention. In this sense, the sequences itself can be operated as an independent module or "work station".

It is important to understand that the central processing system will, normally have no control over how the module performs its assigned task over and above the relatively simple instructions contained in the dictionary ordering that the task be undertaken.

An important aspect of the process for operating robot modules is that the simple computer language used is independent of the modules or individual robot devices. Thus a system approach is readily implemented. When a system containing several modules is run under program control, inter-module co-operation is imposed by the sequencing Control.

It is also to be realized that the system taught herein need not be utilized with a self-configuring robot of the type described in FIGS. 1-3 for particular advantages to be realized. Indeed, even in systems where the number of robotic modules were fixed absolutely, there could be very substantial advantage to utilizing the "teach-a-name" dictionary and the simple sequencing-language-moderated process aspects of the system.

FIG. 9 illustrates a general control system according to the invention.

It will be seen that the dictionary is managed by a sub module 90. Dictionary module 90 provides functions to enter data in the dictionary, look up entries, delete entries, update entries and to store and retrieve the dictionary on external data.

Entries in the dictionary consists of three parts including the name or tag assigned in the "teach and name" process, an indication of what robot module "owns" the entry and parameters which the robot module itself owns and can recognize as an order to perform a particular task. It is the first two parts of the dictionary entry which are defined for the whole system. The third part is defined only with respect to the module which is the "entry owner".

The dictionary 90 in the schematic of FIG. 9 is the keystone of the control system.

The Central Processing Unit 92 supports traditional operating system functions such as task, storage and control management, message passing, and resource allocation.

It includes such hardware resources as the user terminal, the user program and data storage systems, and the remote computer interface. Moreover it supports user program entry, editing, and interpretation in the Language Code 98.

It is believed that operation of these systems, with the exception of the self-configuring aspect and use of the temporary/permanent bimodal dictionary and sequencing language are carried out according to the known state of the art of digital signal processing and computer control. Many languages and specific architectures can be utilized in configuring the system. Programmers and engineers experienced in the design of computerized control systems for robots will be able to adopt the above technique to any number of specific systems suitable for their preferred language and operating requirements.

SUMMARY OF THE INVENTION

It is a principal object of the invention to provide an improved process control means whereby a robotic process may be controlled to achieve highly efficient throughput in serialized processing of a plurality of samples.

Another object of the invention is to provide self-correcting scheduling means.

Another object of the invention is to provide an improved process control system for optimizing serialized processing wherein at least one of the serialized operations utilizes time which time does not require robot manipulator time.

Another object of the invention is to provide means to assure a series of like samples will be processed in an optimum time and with the provision that each sample will have an identical processing history.

A further object of the invention is to provide means to achieve the above objects with efficiency and dependability even when the number processing steps of an operation to be used with a given sample is very high, say hundreds of steps.

Another object of the invention is to provide a scheduling process which is responsive to changes in the procedure when circumstances (say a change to a smaller size of sample to be processed) have enabled the process to be modified.

Other objects of the invention will be obvious to those skilled in the art on their reading of this disclosure.

In a very simple form of a serialized process, a robot would achieve the following series of operations for each sample:

(a) move the sample container into position, say a heated water bath, or incubator;

(b) and, after a certain pre-determined time has passed, (c) move the sample out of position, i.e., out of the heated water bath, say to another processing station.

It is contemplated that the movement of the sample from (b) might contain certain additional robot operations such as holding the sample container while it is acted upon by a robotic bottle capper or some other such operation associated with the removal process. The idea is to be able to do this with a larger number of samples being introduced serially and efficiently into the procedure while maintaining good utility of the water bath, and, while assuring that the heating time in the water bath is the same for each sample.

ILLUSTRATIVE EMBODIMENT OF THE INVENTION

In this application there is described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

Figure 1:
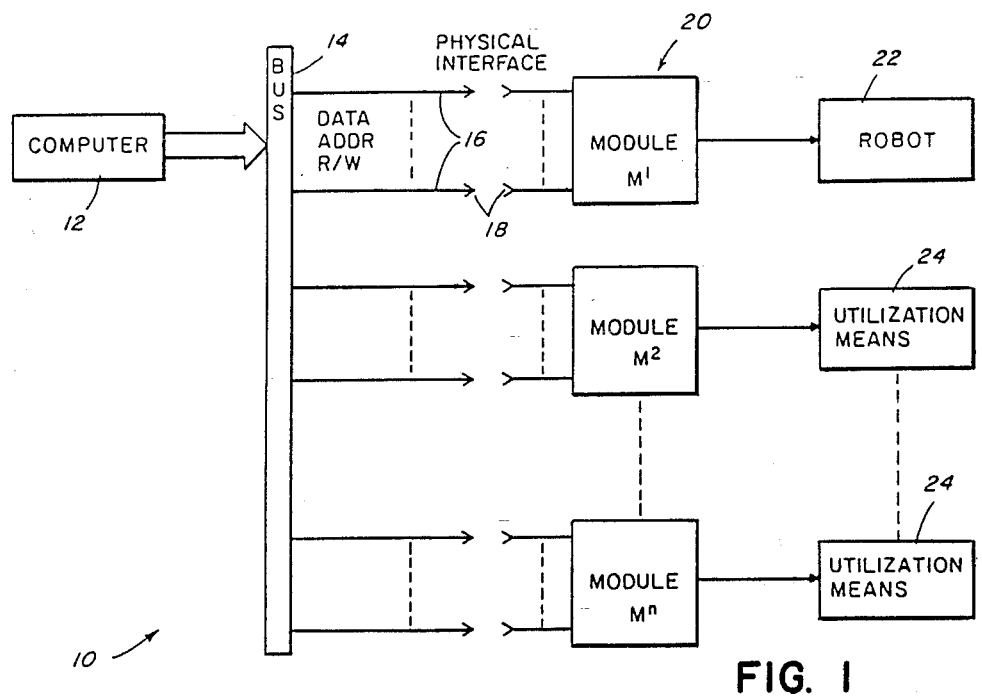
FIG. 1 is a block diagram of the self-configuring robotic system.
Figure 2:
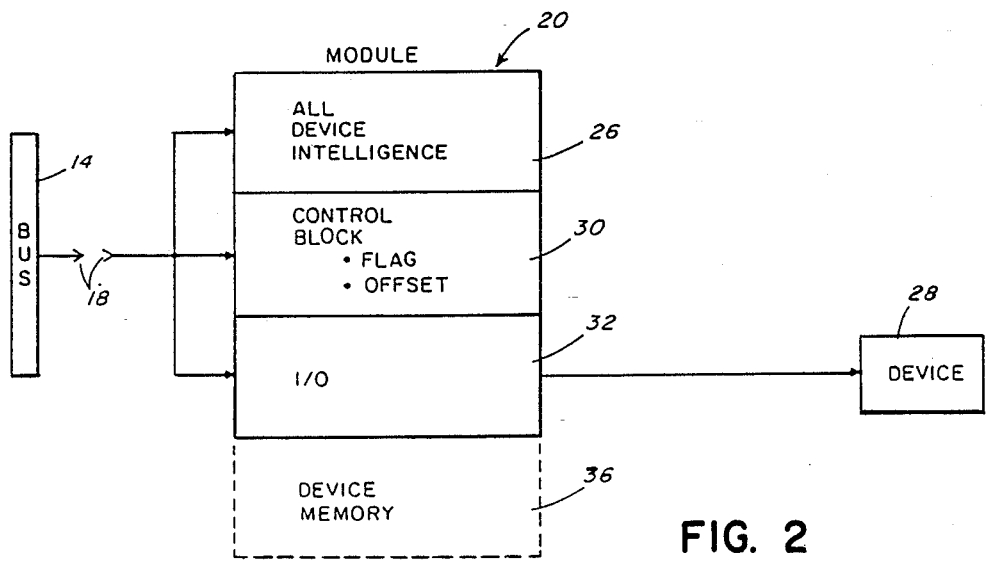
FIG. 2 is a block diagram showing the module of FIG. 1 in greater detail.
Figure 3:
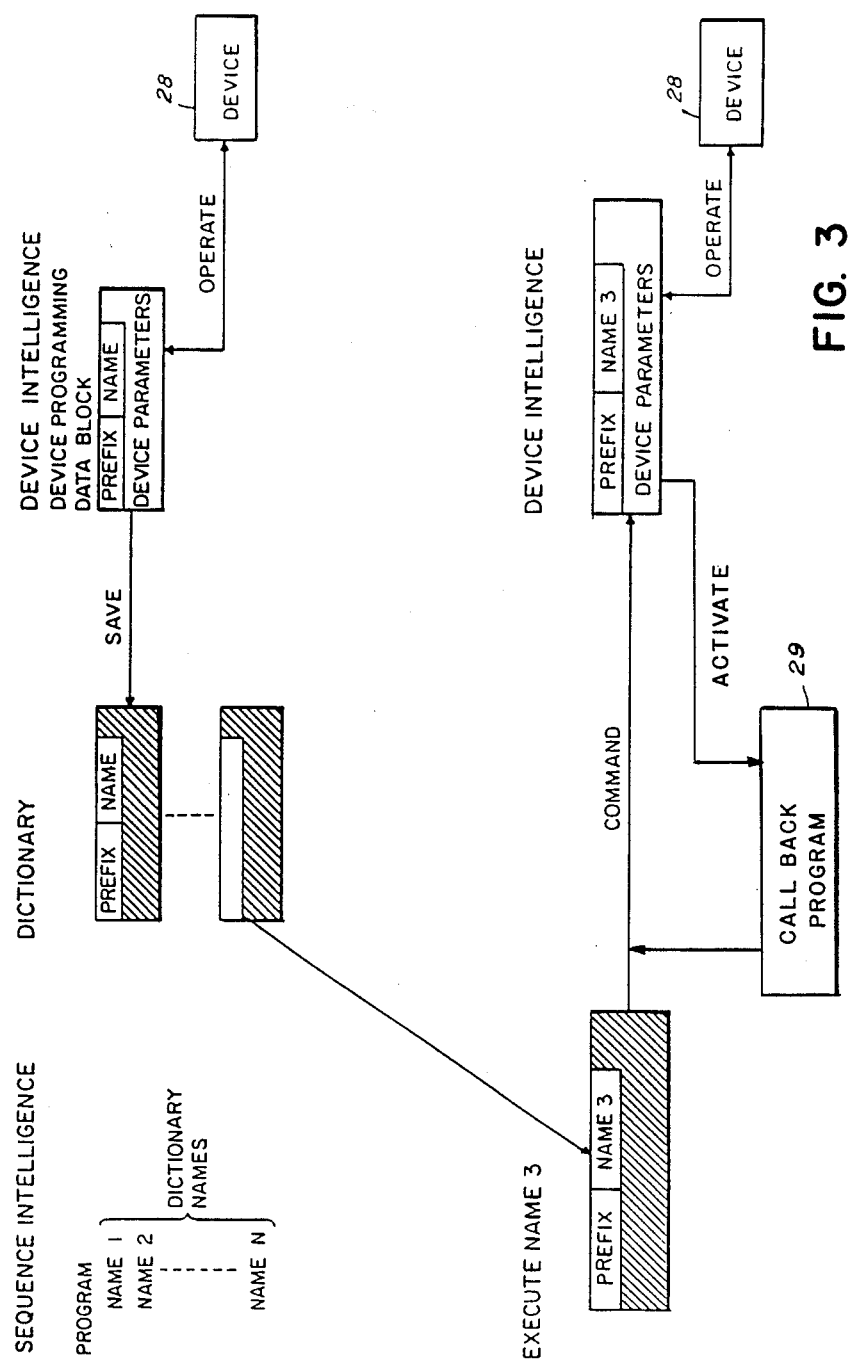
FIG. 3 is a data flow diagram illustrating the data flow paths in the self-configuring robotic system.
Figure 4:
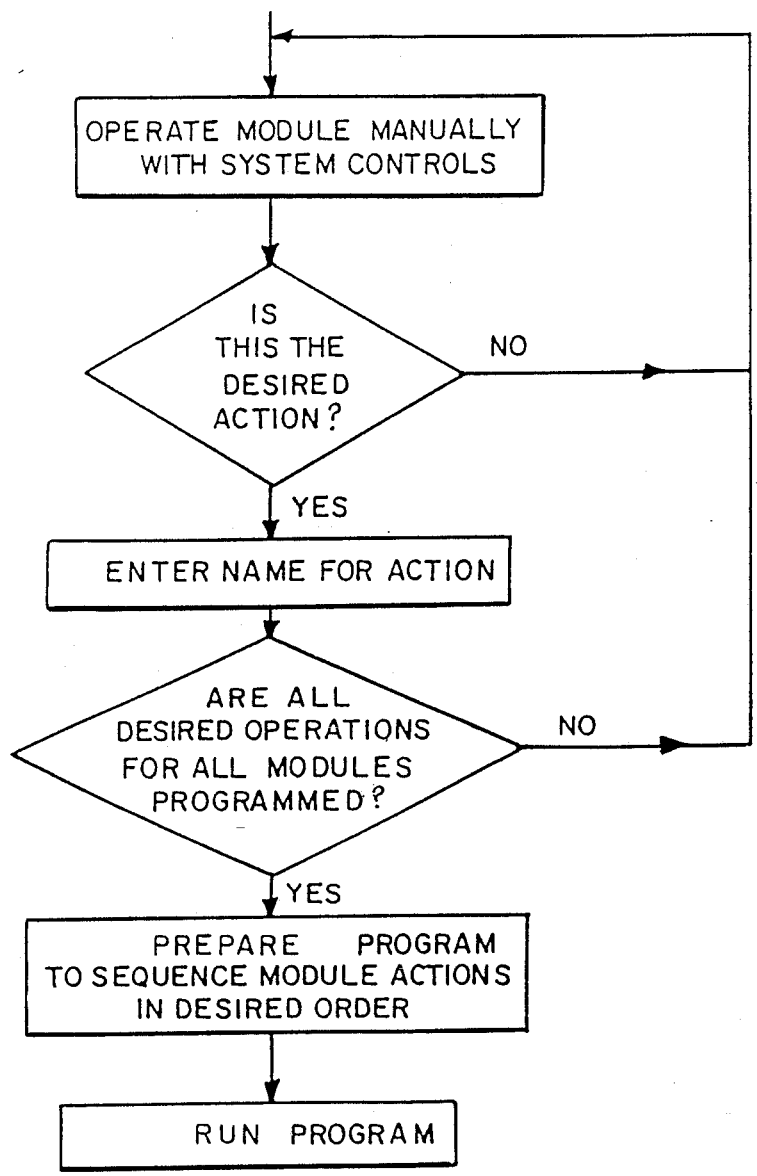
FIG. 4 is an overall schematic diagram of the control prowess of the invention.
Figure 5:
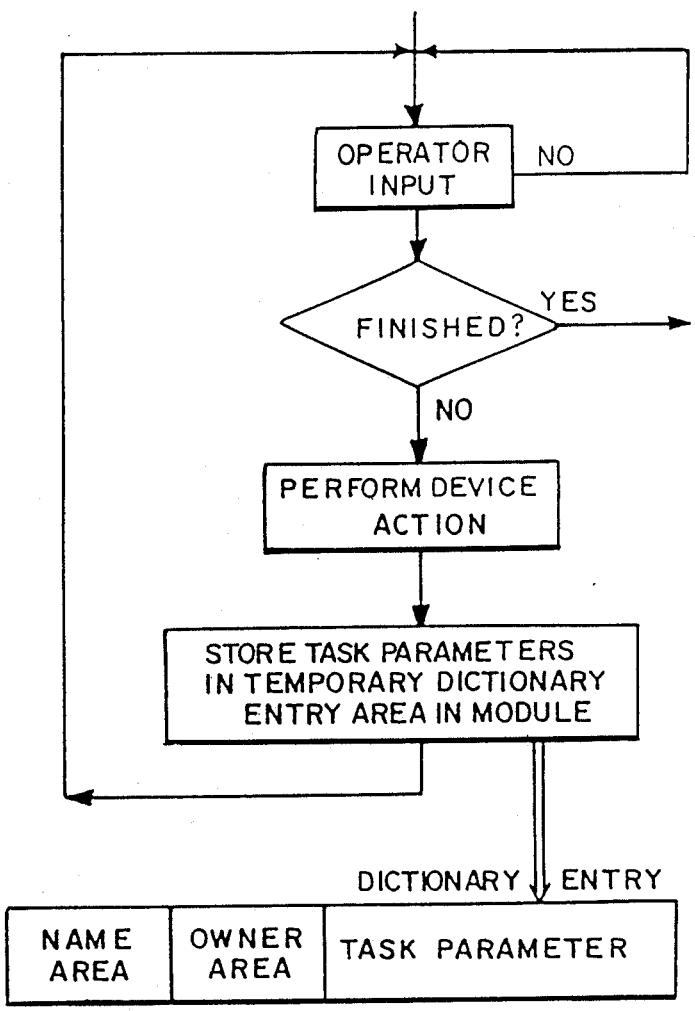
FIG. 5 is a more detailed schematic diagram of the functions associated with operation of a robotic module with the control system controls.
Figure 6:
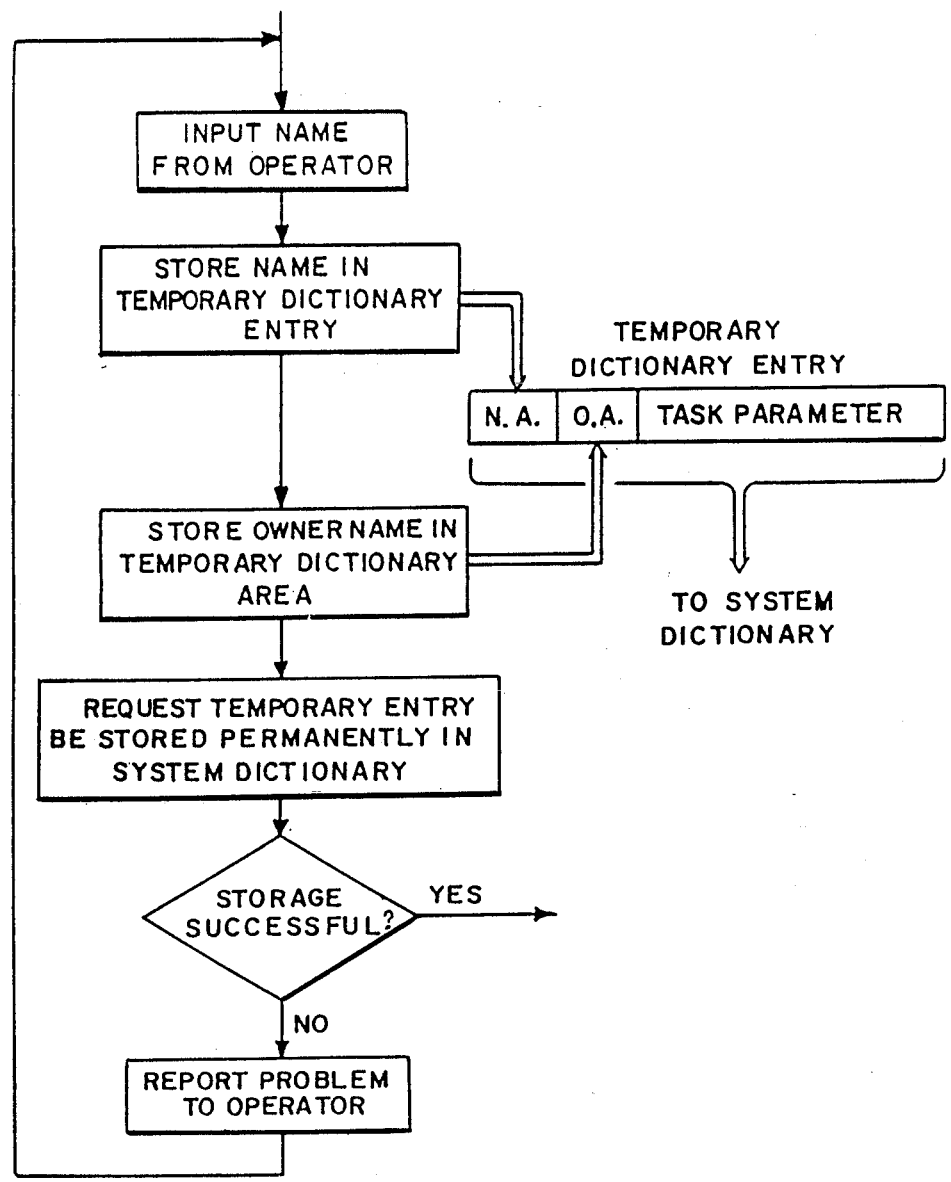
FIG. 6 illustrates the sequences of functions associated with entering a low-level "dictionary entry" for a specific action to be taken by a robot module. If the entry proves storable (no interference such as would be caused by another entry with the same name, etc.) it is "permanently stored in the System Dictionary".
Figure 7:
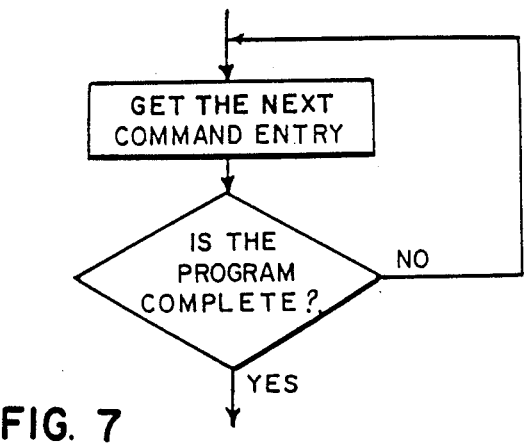
FIG. 7 is a schematic diagram illustrative of the step in preparation of a simple program means for sequencing specific action of, i.e., work-tasks of a number of robot modules.
Figure 8:
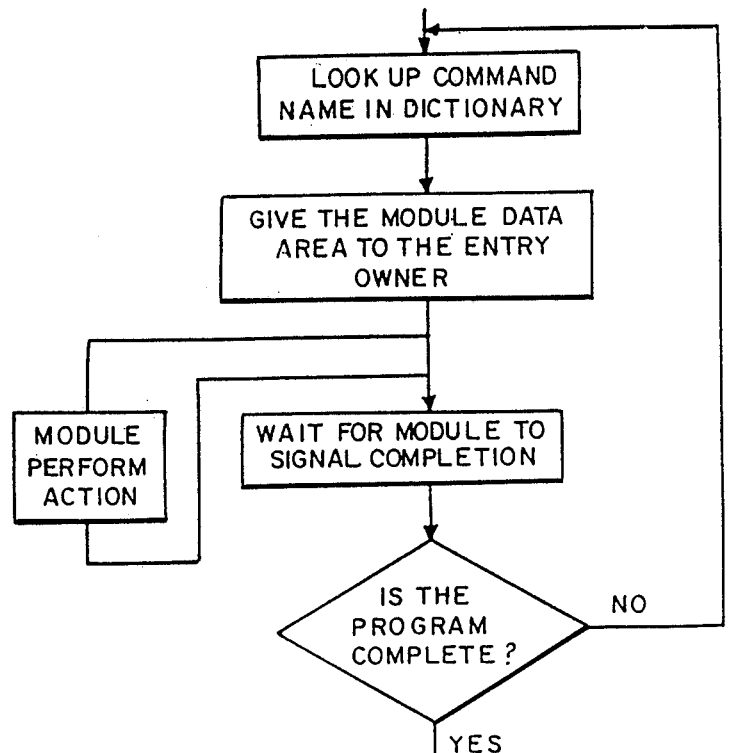
FIG. 8 is an indication of the sequence of steps in implementing the control process described in FIGS. 4 through 7.
Figure 9:
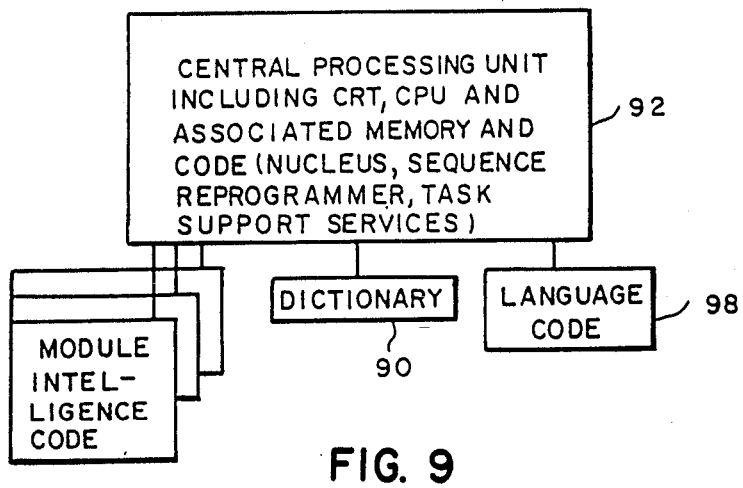
FIG. 9 is a schematic view of the architecture of a robot control system.
Figure 10:
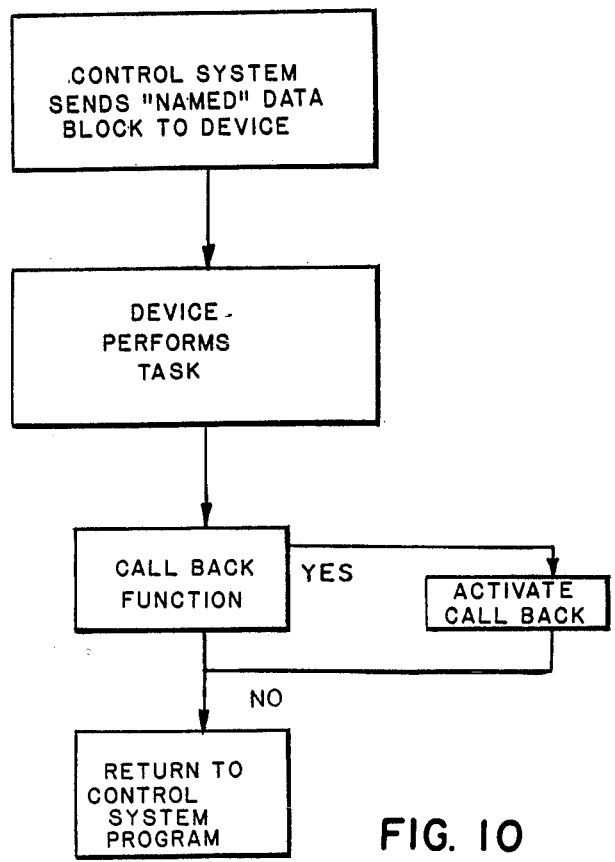
FIG. 10 is a schematic diagram showing the activization of a call-back feature by the device.

Assume we have the following schedule of operations for each sample in a series of samples such as (1) picking up and moving the sample into an incubator, (2) heating the sample therein, and (3) removing the samples, capping it and moving it to the sample sink, i.e., out of the procedure.

Consider the following robotic procedure

Step 1: Pick up sample from input rack, add a solvent diluent at a robotic dispensing station module and mix the resultant liquid for 10 seconds at a robotic mixing station. Remove sample from mixing station. (End of step)

Step 2: Move sample into incubator and release it. (Then some non-robotic time, say 30 minutes, is required in incubator.) Remove sample from incubator. (End of step) Note that the robotic manipulator was used to load and unload only.

Step 3: Move sample from incubator to output rack and release. (End of step)

Further assume we have a set of machinery consisting of a main device (the robot manipulator in our case) which may be used alone or together with other devices to carry out an operation, and other devices which may carry out operations on their own, but must use the robot manipulator for loading and unloading samples. Also assume that the devices which carry out operations on their own (e.g., the incubator which doesn't need the robot to help it incubate) can do so on as many samples as we will have in the device at the same time.

Step 1: uses Device 1 and Robot Manipulator

Step 2: uses Device 2 only except for use of manipulator for loading and unloading Step 3: uses Device 3 and Robot Manipulator Assume also that there is a place to get the next sample from (a source of samples) and a place to put samples when the process is completed (a sink for samples).

The primary scheduling objective is that each sample can proceed with exactly the specified timing for the sample-treatment steps and a uniform timing for the other steps so that all samples have a uniform history as they pass through the procedure. A secondary scheduling objective is to process as many samples per unit of time as possible.

The following generalized computer coding instruction is illustrative of the procedure which may be utilized to obtain optimum serial processing of a plurality of samples. The sequencing procedure will be coded into the computer system as indicated schematically in the next to last block of FIG. 4 when the illustrated system of FIGS. 1–10 are utilized. What happens is that the instruction dictates when the "dictionary name" instruction is to be given for each step and controls the scheduling largely superseding whatever sequence coding had been used previously.

However, those skilled in the art should be able to adapt the following coding instructions to most common computer-instruction formats and consequently, utilize the procedure with any number of computerized machine functions in which it is desired to obtain histories for each of a number of material samples or objects and to do so with good utilization of the robot and its devices.

After the cycle time is established, the determination of whether the robot manipulator is available is made. If it is available, then the procedure is scanned starting at

```
DO WHILE SAMPLES ARE AVAILABLE IN THE SOURCE,
    OR SAMPLES ARE IN PROCESS:
    SAMPLE CYCLE TIME =
        NON-ROBOTIC TIME/(SMALLER OF(
            INTEGER PART (NON-ROBOTIC TIME/ROBOTIC TIME)
            OR NUMBER OF SPACES IN NON-ROBOTIC STEP)).
    IF ROBOT IS AVAILABLE
    THEN DO STARTING AT LAST STEP UNTIL FIRST STEP
            AND WHILE ROBOT IS AVAILABLE.
        IF ROBOT STEP USES THE ROBOT FOR LOADING AND
        UNLOADING ONLY
            AND A SAMPLE IN THE STEP IS READY TO EXIT
        THEN DO.
            SET THE SAMPLE STEP ON THIS STEP.
            GET THE SAMPLE WHICH IS READY FROM THE STEP.
            PERFORM COMPLETION OPERATIONS.
            RECORD COMPLETION TIME IN ROBOTIC TIME
            HISTORY.
            ROBOT IS NOT AVAILABLE.
        END.
        IF STEP STARTS A SAMPLE
        THEN DO.
            IF SAMPLE CYCLE TIME IS UP
            THEN DO.
                PERFORM STEP OPERATIONS
                RECORD OPERATION TIME IN ROBOTIC TIME
                HISTORY.
                ROBOT IS NOT AVAILABLE.
                ADD 1 TO SAMPLES IN PROCESS.
            END.
        END.
    END.
    ELSE DO.
        SET THE SAMPLE STEP ON THE NEXT STEP.
        PERFORM STEP OPERATIONS.
        RECORD OPERATION TIME IN ROBOTIC TIME HISTORY.
        IF (STEP USES THE ROBOT FOR LOADING AND UNLOADING  )
        THEN ROBOT IS AVAILABLE.
        IF STEP IS LAST STEP FOR SAMPLE
        THEN DO.
            SUBTRACT 1 FROM SAMPLES IN PROCESS.
            ROBOT IS AVAILABLE.
        END.
    END.
END.
```

The so-called non-robotic step is one wherein there is some non-robotic time. There will be some robotic time, e.g., loading and unloading time, associated with such a step "Operations" are robotic manipulator-requiring activities.

Figures 11, 12:
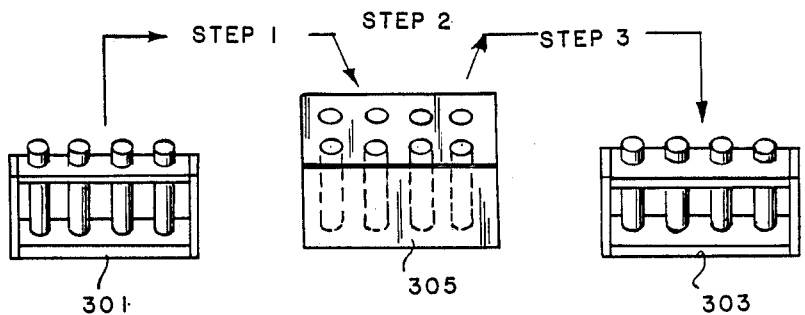
FIG. 11 illustrates graphically how an illustrative process will be scheduled according to the present invention.
FIG. 12 is a schematic diagram of the procedure being illustrated.

The sample processing instructions commanded by the processing scheme in the aforesaid code is based on the availability of samples available in the source which could be a rack of test tubes 301 as seen in FIG. 12 or in processing somewhere between the source 301 and a sink (another rack of processed test tubes) 303.

The sample cycle time is calculated as follows: the "non-robotic" time (herein used to denote the time that the robot manipulator is not required for processing the sample and illustrated by the heating period of Step 2) is divided by the smaller number of (a) the integer part of the non-robotic time divided by robotic time (which in this case is 4, i.e., the integer part of 30 divided by 2+5 or 4.286) or (b) the number of spaces for samples that are available during the non-robotic steps in this case, is 16 spaces in heating rack, that is the time to complete both robotic steps A and C as seen in FIG. 11, or incubator, 305. The determining smaller number is 4, not 16, and consequently the cycle time is selected as 30 divided by 4 or 7.5 minutes.

the last step (and, if necessary, working backwards along the processing path to the first step) looking for a sample which is ready for advancing in the process.

In this procedure, i.e., with the robot manipulator available, if a step (say Step 2) being scanned uses the robot for loading and unloading the sample and a sample is ready to be advanced (unloaded), then the robot gets the sample, sets the sample step to this step, and performs any completion operations (e.g., removes the sample from the heat bath, maybe moves the sample to a capping station where a cap is placed on the container), and records the time taken by the operation of unloading and placing the cap on in robotic time history. At this point, the robot manipulator will be holding the sample removed from the heat bath and will be unavailable.

Had the step being scanned been one which started a sample, i.e., introduced it into the process being "scheduled", and if the sample cycle time (7.5 minutes) had elapsed the manipulator would perform the starting step operation, record the length of the starting robotic operation step time in robotic history. The robot will not be available at this point because it is still holding a sample.

The procedure then allows a further cycle time (the robotic time history feature allows an updating of the sample cycle time based on the robotic operation times actually experienced).

If the process, after the time recomputation, finds the robot to be unavailable, the procedure drops down to the "else do" procedure wherein the sample step that the robot is then handling is set to the next step. The next step is then performed and the robotic time to perform these operations is recorded in the robotic time history of the computer. If this step has used the robot for loading a station, then the robot will be available.

If this step has been the last step for a sample—that is, e.g., if the example has been unloaded into the sample sink—the fact is noted in the computerized control procedure by subtracting "1" from the number of samples in progress. (However, it will often be the case that the step is neither loading, unloading, or a last step, and in that case, the robot will not yet be available and the procedure will be controlled to return again to the "else do" procedure.

If the non-robotic time is actually only 27 minutes, it will be "known" to the scheduler which has kept track of the time in which the robot has been used in a given step. Thus the cycle time can be refined to adapt to the 27 minutes. Usually, however, it is this non-robotic time which will be used as a constant in the scheduling application and the schedule itself will be set for a determined period of time, i.e., the 27 minutes will be extended to 30 minutes for the samples processed after recomputation.

It is to be particularly emphasized that the particular robotic procedure can be modified (usually by reprogramming the control system to order a given module or work station to do something differently: for example take more or less robotic time to obtain or leave a sample at a different destination, or perhaps add or omit a capping step which takes robotic time) in the process being described without substantial description of the serial process and without any independent notification of the "scheduling" code. The scheduler code itself directs the constant monitoring and revision of cycle time based on the new robotic-step time requirements and causes the apparatus to so respond that sample-treatment time remains constant.

Similarly, even if the person setting up the specific code for a given serial procedure is wholly wrong about how long the robot manipulator will take to perform an operation, the mode of control disclosed herein will quickly discover the error and use the actual robotic time used in the robotic operations to recalculate and compel use of the desired cycle time. Even in the example given, if a very large mistake were made in estimating the time of the robotic operations associated with "C" of FIG. 11, only a few samples might be processed with less than an optimum cycle before the cycle were finally recalculated.

In an integrated robotic system as described in this disclosure, changes in the procedure being scheduled will be made by the system operator addressing different modules or work stations. For example, in the simple procedure illustrated herein, the operator—without paying any attention at all to the existence of the scheduler function, may change the incubation time to 20 minutes. The schedule will be able to "see" this happen, and will recompute an appropriate schedule, to keep the procedure on a new appropriate schedule.

The specific robotic system and process of the invention illustrated herein utilizes a unique view of sample processing and robotic supervision thereover, the process is advantageously based on a robot-availability test. Moreover, the partition of process operations is based primarily on the module (work stations or sample-processing devices) not the robot. Thus a processing "step" is taken to end when a sample becomes available for further processing (i.e., is taken out of a device by the robotic manipulator. The process is controlled by a description of steps to be performed on the sample rather than a description of the sequence of operations that the robot is to perform. Historically, control of robotic system has focused primarily on control of the robotic manipulator. In this system, the operator can schedule what is to happen to each sample and the robotic devices will respond to these requirements. Thus, the system calls for the scheduler to determine when operations have to happen to a given sample and all robotic operations are made subsidiary to the requirements of the operator. Thus, usually, the manipulator is unavailable when it finishes a step. It is the approach which allows the system to transcend the conventional boundary between modules (robotic work stations such as mixer, incubators, etc.) and the computer operating system and act as an accessory to the operation system putting the highest priority on sample history, not robotic manipulator history.

In discussing the invention, it is well to consider the "steps" as sample related and "operations" as positions of steps that engage the robotic manipulator, i.e, use robotic time.

FIG. 11 is a chart of a robotic time cycle as each sample is moved through steps A, B, and C to cycle-termination at time X at which each sample exits the scheduler processing segment of the operation.

Although, only a simple serialized program has been illustrated, the capacity of present-day computers will allow processors with hundreds of steps to be serialized and/or scheduled according to the illustrated procedure.

It is also to be understood that the following claims are intended to cover all of the generic and specific features of the invention herein described and all statements of the scope of the invention which might be said to fall therebetween.

What is claimed is:

1. In a robotic process for scheduling the moving of a plurality of samples through a sequence of processing steps, using robotic time of a robotic manipulator, and at least one of which steps takes some non-robotic time, and has said samples in process for a period of time without the need for tending by said robotic manipulator and wherein said sequence for some samples overlap in time with the sequence for other samples such that the manipulator's time is shared among a plurality of samples being processed during any given time, the steps of:
(a) establishing cycle time for a sample which is non-robotic time divided by the smaller quantity of (1) the integer part of the ratio of non-robotic-manipulator time in said sequence to robotic manipulator time in said sequence and (2) the smallest number of sample-receiving spaces in a non-robotic step;
(b) causing said robot manipulator, when available, to process each sample ready to be advanced in, or brought into, the procedure on a sample priority based on the last step in said procedure being given highest priority and the first step in said procedure given lowest priority; and (c) if the robot manipulator is not available, causing said manipulator to proceed to take a sample it is handling into the next step of said procedure and perform the operations for said next step, said cycle time establishing step and said priority-establishing steps, together forming means to assure highly-efficient serial handing of said samples under highly-repetitive conditions.

2. A process as defined in claim 1 wherein the time used by the robotic operations in said steps is entered into the robot control system and used to update the sample cycle time.

3. A robotic system for processing a number of discrete items of material serially through a preselected sequence of steps which sequence includes at lesat one step comprising use of a robotic manipulator and at least one step in which there is time which does not require the use of a robotic manipulator, said system comprising, (a) robotic manipulator;
(b) processing devices for handling or processing said items of material; and
(c) computer control means for controlling how the manipulator's time is shared among a plurality of samples being processed through different steps in said sequence during a given time period;

wherein said computer control means comprises schedule-control code means which form means to;

(d) relate (1) the time within said sequence required to carry out said steps which do not require the robotic manipulator to (2) the time within said sequence which does require the robotic manipulator and the minimum number of processing spaces for samples in non-robotic-manipulator time steps; and (e) provide a priority of action for said robotic manipulator such that a sample which is both ready for further processing and is most advanced in the sequence is given priority for further processing or completion when sid robotic manipulator is available for said further processing.

4. In a robotic process for scheduling the moving each of a plurality of items by a robotic manipulator through a sequence of processing steps using robotic time and non-robotic time, wherein a number of said items are being processed through different steps in said sequence at the same time the improvement comprising the steps of: recomputing a cycle time for each item and modifying the schedule in response to actual robotic-manipulator time usage in each step and the total time used for each step in which there is time when no robotic manipulator is being used.

5. A process as defined in claim 4 wherein each processing step for each item, except the terminal step in a sequence, is defined as ending with the robotic manipulator holding an item being processed.

* * * * *